(12) United States Patent
Liu et al.

(10) Patent No.: US 8,147,604 B2
(45) Date of Patent: Apr. 3, 2012

(54) MODIFIED PIGMENT CONTAINING INKJET INK COMPOSITIONS HAVING A REDUCED CONDUCTIVITY INCREASE

(75) Inventors: Tianqi Liu, Boxborough, MA (US); Robert J. Nick, Pepperell, MA (US)

(73) Assignee: Cabot Corporation, Boston, MA (US)

( * ) Notice: Subject to any disclaimer, the term of this patent is extended or adjusted under 35 U.S.C. 154(b) by 65 days.

(21) Appl. No.: 12/655,647

(22) Filed: Jan. 5, 2010

(65) Prior Publication Data

US 2010/0175585 A1    Jul. 15, 2010

Related U.S. Application Data

(60) Provisional application No. 61/204,735, filed on Jan. 9, 2009.

(51) Int. Cl.
*C09D 11/02* (2006.01)
(52) U.S. Cl. .................. 106/31.76; 106/31.75; 106/31.6
(58) Field of Classification Search ............... 106/31.76, 106/31.75, 31.6
See application file for complete search history.

(56) References Cited

U.S. PATENT DOCUMENTS

| | | | |
|---|---|---|---|
| 5,698,016 A | 12/1997 | Adams et al. | |
| 5,830,265 A | 11/1998 | Tsang et al. | |
| 5,837,045 A | 11/1998 | Johnson et al. | |
| 5,958,999 A | 9/1999 | Bates et al. | |
| 5,985,016 A | 11/1999 | Tsang et al. | |
| 6,110,994 A | 8/2000 | Cooke et al. | |
| 6,328,894 B1 | 12/2001 | Chan et al. | |
| 6,458,458 B1 | 10/2002 | Cooke et al. | |
| 6,478,863 B2 | 11/2002 | Johnson et al. | |
| 6,723,783 B2 | 4/2004 | Palumbo et al. | |
| 7,056,962 B2 | 6/2006 | Johnson et al. | |
| 7,544,238 B1 | 6/2009 | Belmont | |
| 7,695,555 B2 | 4/2010 | Kabalnov et al. | |
| 2007/0100023 A1 | 5/2007 | Burns et al. | |
| 2007/0100024 A1 | 5/2007 | Gu et al. | |
| 2009/0229489 A1 | 9/2009 | Gu | |

FOREIGN PATENT DOCUMENTS

| WO | WO2007/053563 | 5/2007 |
| WO | WO2009/094178 | 7/2009 |
| WO | WO2009/117071 A1 | 9/2009 |

OTHER PUBLICATIONS

JP2002-241657 to Canon Inc. (Aug. 28, 2002)—Abstract Only.
International Preliminary Report on Patentability for International Application No. PCT/US2010/000013, mailed Jul. 21, 2011.

*Primary Examiner* — Jerry Lorengo
*Assistant Examiner* — Veronica F Faison

(57) ABSTRACT

The present invention relates to a modified pigment comprising a pigment having attached at least one salt of a geminal bisphosphonic acid group or partial esters thereof, as well as to dispersions and inkjet ink compositions comprising such modified pigments. Preferably the salt comprises a quaternary ammonium counterion.

43 Claims, 3 Drawing Sheets

MODIFIED PIGMENT CONTAINING INKJET INK COMPOSITIONS HAVING A REDUCED CONDUCTIVITY INCREASE

CROSS-REFERENCE TO RELATED APPLICATIONS

This patent application claims the benefit of U.S. Provisional Patent Application No. 61/204,735, filed Jan. 9, 2009.

BACKGROUND OF THE INVENTION

1. Field of the Invention

The present invention relates to a modified pigment having a reduced conductivity increase as well as inkjet ink compositions comprising these modified pigments.

2. Description of the Related Art

Methods for the preparation of modified pigment products have been developed which can provide a pigment with a variety of different attached functional groups. For example, U.S. Pat. No. 5,851,280 discloses methods for the attachment of organic groups onto pigments including, for example, attachment via a diazonium reaction wherein the organic group is part of the diazonium salt.

Other methods to prepare modified pigments, including those having attached polymeric groups, have also been described. For example, PCT Publication No. WO 01/51566 discloses methods of making a modified pigment by reacting a first chemical group and a second chemical group to form a pigment having attached a third chemical group. Also, U.S. Patent Application Publication No. 2007/0100024 discloses modified colorants comprising a colorant having attached at least one organic group, wherein the organic group has a defined calcium index values. Specific embodiments of the organic groups are described, including organic groups comprising at least one geminal bisphosphonic acid group, partial esters thereof, or salts thereof. In addition, U.S. Pat. Nos. 5,672,198, 5,922,118, 6,042,643, and 6,641,656 disclose modified pigments having various attached groups, including phosphonic acid groups.

Ink compositions, including inkjet inks, containing these modified pigments have also been described, and these inkjet inks have been shown to have good overall performance properties. In general, the properties of these inkjet ink compositions depend on a variety of factors, including pigment type, type of attached group, and types of additives, and thus, modified pigments can be tailored to meet the needs of various types of inkjet ink compositions, including those useful for both thermal and piezo inkjet ink printers.

However, as the requirements of the various inkjet ink industries become more demanding, there remains a need for modified pigments having improved performance properties, such as low conductivity for piezo printers, particularly those using shear mode printheads, thereby providing advantageous alternatives to previous modified pigments.

SUMMARY OF THE INVENTION

The present invention relates to an inkjet ink composition comprising a) a liquid vehicle, b) an optional cosolvent, and c) at least one modified pigment comprising a pigment having attached at least one salt of a geminal bisphosphonic acid group or partial esters thereof. In one embodiment, the salt of the geminal bisphosphonic acid group or partial esters thereof has a corresponding quaternary ammonium counterion having the structure $NR'_4{}^+$, wherein R', which can be the same or different, is H, a C1-C6 alkyl group, an aryl group, or form a ring and wherein the quaternary ammonium counterion has at least 6 total carbons. In another embodiment, the inkjet ink composition comprises a cosolvent in an amount of from 10% to 40% by weight, based on the total weight of the inkjet ink composition, and has a conductivity of less than or equal to 1000 microsiemens/cm at a modified pigment content of from 10% to 15% by weight and further has a conductivity of less than or equal to 1000 microsiemens/cm after 4 weeks at 60° C. at a modified pigment content of from 10% to 15% by weight.

The present invention further relates to a modified pigment comprising a pigment having attached at least one salt of a geminal bisphosphonic acid group or partial esters thereof having a corresponding quaternary ammonium counterion having the structure $NR'_4{}^+$, wherein R', which can be the same or different, is H, a C1-C6 alkyl group, an aryl group, or form a ring and wherein the quaternary ammonium counterion has at least 6 total carbons. The modified pigment can be in the form of a solid or in the form of a dispersion, particularly an aqueous dispersion.

The present invention further relates to a method of reducing the conductivity increase of an aqueous modified pigment dispersion. The method comprises the steps of: i) providing an aqueous dispersion of a modified pigment comprising a pigment having attached at least one salt of a geminal bisphosphonic acid group or partial esters thereof having a corresponding counterion, ii) ion exchanging the counterion of the modified pigment to form an aqueous dispersion of a modified pigment comprising a pigment having attached at least one salt of a geminal bisphosphonic acid group or partial esters thereof having a corresponding quaternary ammonium counterion having the structure $NR'_4{}^+$, wherein R', which can be the same or different, is H, a C1-C6 alkyl group, an aryl group, or form a ring and wherein the quaternary ammonium counterion has at least 6 total carbons, and, iii) optionally heat aging the aqueous dispersion of step ii) at a temperature of from 50° C. to 100° C. for a time between 0.5 and 5 days to form an aqueous dispersion of a modified pigment further comprising desorbed ions, and removing the desorbed ions; to form the aqueous modified pigment dispersion having a reduced conductivity increase.

It is to be understood that both the foregoing general description and the following detailed description are exemplary and explanatory only and are intended to provide further explanation of the present invention, as claimed.

DETAILED DESCRIPTION OF THE INVENTION

Figure 1:
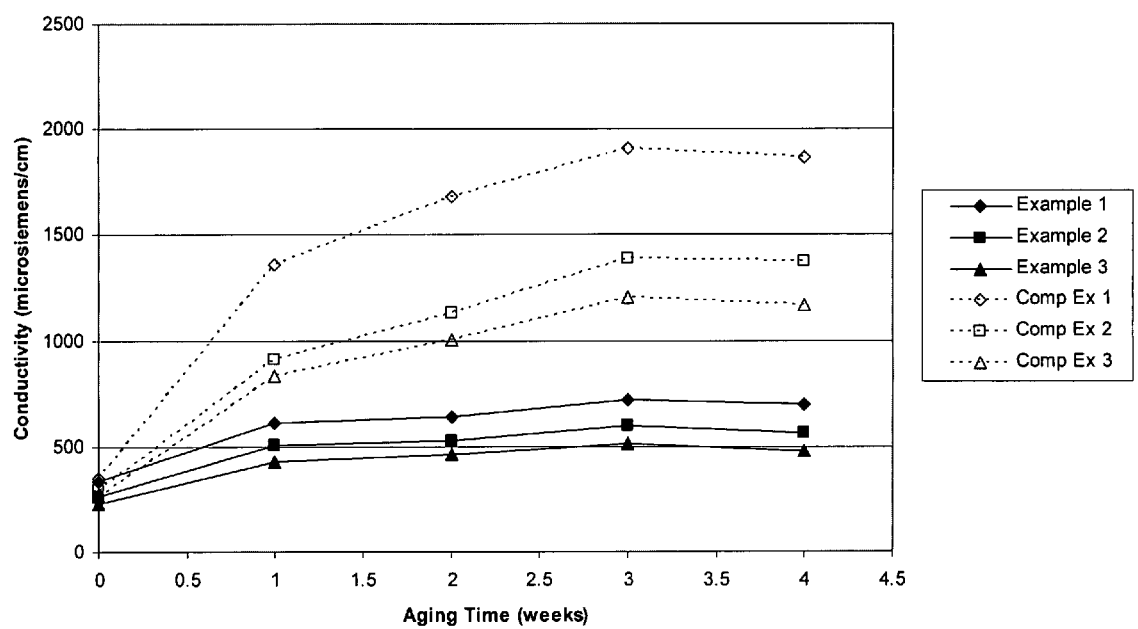
FIG. 1, FIG. 2, and FIG. 3 show conductivity curves over time for aqueous dispersions of modified pigments of the present invention.

The present invention relates to inkjet ink compositions comprising modified pigments, and the inkjet ink compositions have a reduced conductivity increase.

The inkjet ink compositions of the present invention comprise a modified pigment which comprises a pigment having attached at least one organic group, which is described in more detail below. The pigment of the modified pigment is a solid material, generally in the form of a particulate or in a form readily formed into a particulate, such as a pressed cake. The pigment can be any type of pigment conventionally used by those skilled in the art, such as black pigments and other colored pigments including blue, black, brown, cyan, green, white, violet, magenta, red, orange, or yellow pigments. Mixtures of different pigments can also be used. Representative examples of black pigments include various carbon blacks (Pigment Black 7) such as channel blacks, furnace blacks, gas blacks, and lamp blacks, and include, for example, carbon blacks sold under the Regal®, Black Pearls®, Elftex®, Monarch®, Mogul®, and Vulcan® trademarks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® 570, Black Pearls® L, Elftex® 8, Monarch® 1400, Monarch® 1300, Monarch® 1100, Monarch® 1000, Monarch® 900, Monarch® 880, Monarch® 800, Monarch® 700, Regal® 660, Mogul® L, Regal® 330, Regal® 400, Vulcan® P). Carbon blacks available from other suppliers can be used. Suitable classes of colored pigments include, for example, anthraquinones, phthalocyanine blues, phthalocyanine greens, diazos, monoazos, pyranthrones, perylenes, heterocyclic yellows, quinacridones, quinolonoquinolones, and (thio)indigoids. Such pigments are commercially available in either powder or press cake form from a number of sources including, BASF Corporation, Engelhard Corporation, Sun Chemical Corporation, Clariant, and Dianippon Ink and Chemicals (DIC). Examples of other suitable colored pigments are described in the Colour Index, 3rd edition (The Society of Dyers and Colourists, 1982). Preferably the pigment is a cyan pigment, such as Pigment Blue 15 or Pigment Blue 60, a magenta pigment, such as Pigment Red 122, Pigment Red 177, Pigment Red 185, Pigment Red 202, or Pigment Violet 19, a yellow pigment, such as Pigment Yellow 74, Pigment Yellow 128, Pigment Yellow 139, Pigment Yellow 155, Pigment Yellow 180, Pigment Yellow 185, Pigment Yellow 218, Pigment Yellow 220, or Pigment Yellow 221, an orange pigment, such as Pigment Orange 168, a green pigment, such as Pigment Green 7 or Pigment Green 36, or black pigment, such as carbon black.

The pigment can have a wide range of BET surface areas, as measured by nitrogen adsorption, depending on the desired properties of the pigment. Preferably, the pigments have a BET surface area between about 10 $m^2/g$ and about 1500 $m^2/g$, more preferably between about 20 $m^2/g$ and about 600 $m^2/g$ and most preferably between about 50 $m^2/g$ and about 300 $m^2/g$. If the desired surface area is not readily available for the desired application, it is also well recognized by those skilled in the art that the pigment may be subjected to conventional size reduction or comminution techniques, such as ball or jet milling or sonication, to reduce the pigment to a smaller particle size, if desired. Also, the pigment can have a wide variety of primary particle sizes known in the art. For example, the pigment may have a primary particle size of between about 5 nm to about 100 nm, including about 10 nm to about 80 nm and 15 nm to about 50 nm. In addition, the pigment can also have a wide range of dibutylphthalate absorption (DBP) values, which is a measure of the structure or branching of the pigment. For example, the pigment may be a carbon black having a DBP value of from about 25 to 400 mL/100 g, including from about 30 to 200 mL/100 g and from about 50 to 150 mL/100 g. Also, the pigment may be an organic colored pigment having an oil adsorption value (as described in ISO 787 T5) of from about 5 to 150 mL/100 g, including from about 10 to 100 mL/100 g and from about 20 to 80 mL/100 g.

The pigment may also be a pigment that has been oxidized using an oxidizing agent in order to introduce ionic and/or ionizable groups onto the surface. Oxidized pigments prepared in this way have been found to have a higher degree of oxygen-containing groups on the surface. Suitable oxidizing agents include, but are not limited to, oxygen gas, ozone, $NO_2$ (including mixtures of $NO_2$ and air), peroxides such as hydrogen peroxide, persulfates, including sodium, potassium, or ammonium persulfate, hypohalites such as sodium hypochlorite, halites, halates, or perhalates (such as sodium chlorite, sodium chlorate, or sodium perchlorate), oxidizing acids such as nitric acid, and transition metal containing oxidants, such as permanganate salts, osmium tetroxide, chromium oxides, or ceric ammonium nitrate. Mixtures of oxidants may also be used, particularly mixtures of gaseous oxidants such as oxygen and ozone. In addition, pigments prepared using other surface modification methods to introduce ionic or ionizable groups onto a pigment surface, such as chlorination and sulfonylation, may also be used.

As described above, the modified pigment of the present invention comprises the pigment having attached at least one organic group. Preferably the organic group is directly attached. The modified pigment may be prepared using any method known to those skilled in the art such that organic chemical groups are attached to the pigment. For example, the modified pigments can be prepared using the methods described in U.S. Pat. Nos. 5,554,739, 5,707,432, 5,837,045, 5,851,280, 5,885,335, 5,895,522, 5,900,029, 5,922,118, and 6,042,643, and PCT Publication WO 99/23174, the descriptions of which are fully incorporated herein by reference. Such methods provide for a more stable attachment of the groups onto the pigment compared to dispersant type methods, which use, for example, polymers and/or surfactants. Other methods for preparing the modified pigments include reacting a pigment having available functional groups with a reagent comprising the organic group, such as is described in, for example, U.S. Pat. No. 6,723,783, which is incorporated in its entirety by reference herein. Such functional pigments may be prepared using the methods described in the references incorporated above. In addition modified carbon blacks containing attached functional groups may also be prepared by the methods described in U.S. Pat. Nos. 6,831,194 and 6,660,075, U.S. Patent Publication Nos. 2003-0101901 and 2001-0036994, Canadian Patent No. 2,351,162, European Patent No. 1 394 221, and PCT Publication No. WO 04/63289, as well as in N. Tsubokawa, Polym. Sci., 17, 417, 1992, each of which is also incorporated in their entirety by reference herein.

The organic group of the modified pigment comprises at least one geminal bisphosphonic acid group, partial esters thereof, or salts thereof—that is, the organic group comprises at least two phosphonic acid groups, partial esters thereof, or salts thereof that are directly bonded to the same carbon atom. Such a group may also be referred to as a 1,1-diphosphonic acid group, partial ester thereof, or salt thereof. By "partial ester thereof" is meant that the phosphonic acid group may be a partial phosphonic acid ester group having the formula —$PO_3AH$, or a salt thereof, wherein A is an aryl, alkaryl, aralkyl, or alkyl group. Either or both of the phosphonic acid groups of the organic group may be a partial phosphonic acid ester group. Also, one of the phosphonic acid groups may be a phosphonic acid ester having the formula —$PO_3A_2$ while the other phosphonic acid group may be a partial phosphonic acid ester group, a phosphonic acid group, or a salt thereof. However, it is preferred that at least one of the phosphonic acid groups is a salt of a phosphonic acid or a partial ester thereof.

For example, the organic group of the modified pigment may comprise a salt of a group having the formula —$CQ(PO_3H_2)_2$ or partial esters thereof. Q is bonded to the geminal position and may be H, R, OR, SR, or $NR_2$ wherein R, which can be the same or different, is H, a C1-C18 saturated or unsaturated, branched or unbranched alkyl group, a C1-C18 saturated or unsaturated, branched or unbranched acyl group, an aralkyl group, an alkaryl group, or an aryl group. For example, Q may be H, R, OR, SR, or $NR_2$, wherein R, which can be the same or different, is H, a C1-C6 alkyl group, or an aryl group. Preferably Q is H, OH, or $NH_2$. Furthermore, the organic group may comprise a salt of a group having the formula $—(CH_2)_n—CQ(PO_3H_2)_2$ or partial esters thereof, wherein Q is as described above and n is 0 to 9, such as 1 to 9. Preferably n is 0 to 3, such as 1 to 3. Also, the organic group may comprise a salt of a group having the formula —X—$(CH_2)_n$—$CQ(PO_3H_2)_2$ or partial esters thereof, wherein Q and n are as described above and X is an arylene, heteroarylene, alkylene, vinylidene, alkarylene, aralkylene, cyclic, or heterocyclic group. Preferably X is an arylene group, such as a phenylene, naphthalene, or biphenylene group, which may be further substituted with any group, such as one or more alkyl groups or aryl groups. When X is an alkylene group, examples include, but are not limited to, substituted or unsubstituted alkylene groups, which may be branched or unbranched and can be substituted with one or more groups, such as aromatic groups. Examples include, but are not limited to, $C_1$-$C_{12}$ groups such as methylene, ethylene, propylene, or butylene, groups. Preferably, X is directly attached to the pigment, meaning there are no additional atoms or groups from the attached organic group between the pigment and X.

In addition, the organic group may comprise a salt of a group having the formula —X-Sp-$(CH_2)_n$—$CQ(PO_3H_2)_2$ or partial esters thereof, wherein X, Q, and n are as described above. Sp is a spacer group, which, as used herein, is a link between two groups. Sp can be a bond or a chemical group. Examples of chemical groups include, but are not limited to, —$CO_2$—, —$O_2C$—, —CO—, —$OSO_2$—, —$SO_3$—, —$SO_2$—, —$SO_2C_2H_4O$—, —$SO_2C_2H_4S$—, —$SO_2C_2H_4NR''$—, —O—, —S—, —NR''—, —NR''CO—, —CONR''—, —$NR''CO_2$—, —$O_2CNR''$—, —NR'' CONR''—, —N(COR'')CO—, —CON(COR'')—, —NR'' $COCH(CH_2CO_2R'')$— and cyclic imides therefrom, —$NR''COCH_2CH(CO_2R'')$— and cyclic imides therefrom, —$CH(CH_2CO_2R'')CONR''$— and cyclic imides therefrom, —$CH(CO_2R'')CH_2CONR''$ and cyclic imides therefrom (including phthalimide and maleimides of these), sulfonamide groups (including —$SO_2NR''$— and —$NR''SO_2$— groups), arylene groups, alkylene groups and the like. R'', which can be the same or different, represents hydrogen or an organic group such as a substituted or unsubstituted aryl or alkyl group. As shown by the structure above, a group comprising at least two phosphonic acid groups or salts thereof is bonded to X through the spacer group Sp. Preferably, Sp is —$CO_2$—, —$O_2C$—, —O—, —NR''—, —NR''CO—, or —CONR''—, —$SO_2NR''$—, —$SO_2CH_2CH_2NR''$—, —$SO_2CH_2CH_2O$—, or —$SO_2CH_2CH_2S$— wherein R'' is H or a C1-C6 alkyl group.

Furthermore, the organic group may comprise a salt of a group having the formula —$CR(PO_3H_2)_2$ or partial esters thereof. In this formula, R is H or a C1-C6 alkyl group, such as a methyl or ethyl group, but is preferably H. For example, the organic group may comprise a salt of a group having the formula —$CO-Q-CH(PO_3H_2)_2$ or —$SO_2-Q-CH(PO_3H_2)_2$ or partial esters thereof, wherein Q is O, S, or NR''' and R''' is H, a C1-C18 alkyl group, a C1-C18 acyl group, an aralkyl group, an alkaryl group, or an aryl group. Preferably, Q is NH, and, thus, the organic group comprises at least one alkyl amide group wherein the alkyl group is a salt of a geminal bisphosphonic acid group or partial esters thereof.

As a specific example, the organic group may be a salt of a group having the formula —X—$CO-Q-CH(PO_3H_2)_2$ or —X—$SO_2-Q-CH(PO_3H_2)_2$ or partial esters thereof. In this example, X is attached to the pigment and is an arylene, heteroarylene, alkylene, alkarylene, or aralkylene group. When X is an alkylene group, examples include, but are not limited to, substituted or unsubstituted alkylene groups, which may be branched or unbranched and can be substituted with one or more groups, such as aromatic groups. Specific examples include C1-C12 groups, such as methylene, ethylene, propylene, or butylene groups. Preferably X is an arylene group, such as a phenylene, naphthalene, or biphenylene group. For example, the organic group may be a salt of a —$C_6H_4$—$CONHCH(PO_3H_2)_2$ group, a salt of a —$C_6H_4$—$SO_2NHCH(PO_3H_2)_2$ group, or partial esters thereof. Preferably, X is directly attached to the pigment, meaning there are no additional atoms or groups from the attached organic group between the pigment and X.

In the formulas above, X may be further substituted with one or more functional groups. Examples of functional groups include, but are not limited to, R, OR, COR, COOR, OCOR, carboxylates, halogens, CN, $NR_2$, $SO_3H$, sulfonates, sulfates, NR(COR), $CONR_2$, imides, $NO_2$, phosphates, phosphonates, N=NR, SOR, $NRSO_2R$, and $SO_2NR_2$, wherein, in these formulas, R, which can be the same or different, is independently hydrogen or a branched or unbranched, substituted or unsubstituted, saturated or unsaturated C1-C20 hydrocarbon group, e.g., an alkyl, alkenyl, alkynyl; substituted or unsubstituted aryl, substituted or unsubstituted heteroaryl, substituted or unsubstituted alkaryl, or substituted or unsubstituted aralkyl group.

As discussed above, the organic group comprises at least one salt of a geminal bisphosphonic acid group or partial esters thereof. By "salt" is meant that the phosphonic acid group is in a partially or fully ionized form having a cationic counterion. Either or both of the phosphonic acid groups of the organic group may be in either a partially or fully ionized form. Thus, the organic group may comprise at least one geminal bisphosphonic acid group, wherein either or both phosphonic acid groups have the formula —$PO_3H^-M^+$ (monobasic salt) or —$PO_3^{-2}M^{+2}$ (dibasic salt). Also, one phosphonic acid group may have the formula —$PO_3H_2$. In these formulas, $M^+$ is a cation such as $Na^+$, $K^+$, $Li^+$, or $NR'_4^+$, wherein R', which can be the same or different, represents hydrogen or an organic group such as a substituted or unsubstituted aryl and/or alkyl group.

Preferably, the cationic counterion is a quaternary ammonium counterion having the structure $NR'_4^+$, wherein R', which can be the same or different, is H, an alkyl group, or an aryl group. Two or more of the R groups can form one or more aliphatic and/or aromatic ring(s), such as a pyridinium ring. The ring may also include one or more additional heteroatoms. For example, the cationic counterion can be a quaternary alkyl ammonium counterion having the structure $NR'_4^+$, wherein R', which can be the same or different, is H or a C1-C6 alkyl group. The quaternary ammonium counterion has at least 6 total carbons. More preferably, the quaternary ammonium counterion is a quaternary alkyl ammonium counterion wherein at least one R' is a C2-C6 alkyl group. A specific preferred example is a tetraethylammonium counterion. Modified pigments comprising a pigment having attached at least one salt of a geminal bisphosphonic acid group or partial esters thereof having such a corresponding quaternary ammonium counterion have been found to have surprising properties, particularly when used in the form of a dispersion, such as an aqueous dispersion, described in more detail below. While these preferred modified pigments can be prepared using the methods described above relating to the preparation of modified pigments comprising a pigment having attached at least one salt of a geminal bisphosphonic acid group or partial esters thereof, in addition, these preferred modified pigments can be prepared from a previously prepared pigment having attached a salt of geminal bisphosphonic acid group or partial ester thereof by ion exchanging the salt for the preferred quaternary ammonium counterion. This method allows for control of the amount of quaternary ammonium counterion present.

The amount of attached organic groups can be varied, depending on the desired use of the modified pigment and the type of the attached group. For example, the total amount of organic group may be from about 0.01 to about 10.0 micromoles of groups/$m^2$ surface area of pigment, as measured by nitrogen adsorption (BET method), including from about 0.5 to about 5.0 micromoles/$m^2$, from about 1 to about 3 micromoles/$m^2$, or from about 2 to about 2.5 micromoles/$m^2$. Additional attached organic groups, which differ from those described for the various embodiments of the present invention, may also be present, including, for example, ionic or ionizable groups, such as those described in U.S. Pat. Nos. 5,630,868 and 5,698,016, and polymeric groups.

The modified pigment of the present invention can be in a variety of different forms. For example, the modified pigment may be a dry form, such as a powder, pellet, granule, or cake. As used herein, the term "dry" relating to the form of the modified pigment does not mean substantially free of volatile material. Rather, the term refers to the physical state of the material. Thus, dry forms include forms containing a high level, such as about 50% or more, of a volatile solvent. The dry form may be a material having the consistency of, for example, a paste or putty in a solid or semi-solid form or may be, for example, a free flowing or tacky powder.

The modified pigment of the present invention can also be in the form of a dispersion in a liquid vehicle. The vehicle can be either an aqueous or non-aqueous liquid vehicle, but is preferably a vehicle that contains water. Thus, the vehicle is preferably an aqueous vehicle, which is a vehicle that contains greater than 50% by weight water and can be, for example, water or mixtures of water with water miscible solvents such as alcohols. Non-aqueous vehicles are those that contain less than 50% by weight water or are not miscible with water. The amount of modified pigment used in the dispersion form can be varied but is typically in an amount ranging from about 0.1% to about 20% based on the weight of the inkjet ink composition. Furthermore, the dispersion may contain suitable additives known in the art that impart desirable properties to the dispersion.

The dispersion can be prepared using any method known in the art. For example, the modified pigment in a dry form may be combined with the liquid vehicle with agitation to produce a stable dispersion. Any equipment known in the art, such as a media or ball mill, or other high shear mixing equipment can be used, and various conventional milling media may also be used. Other methods for forming the dispersion will be known to one skilled in the art.

The modified pigment of the present invention may be used in a variety of different applications, including, for example, plastic compositions, aqueous or non-aqueous inks, aqueous or non-aqueous coatings, rubber compositions, paper compositions and textile compositions. In particular, these modified pigments have been found to be capable of forming stable aqueous dispersions that can be used in various aqueous compositions, including, for example, automotive and industrial coatings, paints, toners, adhesives, latexes, and inks.

The modified pigments of the present invention have been found to be especially useful in ink compositions, and, in particular, inkjet ink compositions. Therefore, the present invention further relates to an inkjet ink composition comprising a liquid vehicle and at least one modified pigment, as described herein. The liquid vehicle can be any of those described above relating to the dispersion form of the modified pigment, but is preferably an aqueous vehicle. The amount of modified pigment used in the inkjet ink composition can be varied but is typically in an amount effective to provide the desired image quality (for example, optical density) without detrimentally affecting the performance of the inkjet ink. For example, typically, the modified pigment will be present in an amount ranging from about 0.1% to about 20% based on the weight of the inkjet ink composition.

The inkjet ink compositions of the present invention can be formed with a minimum of additional components (additives and/or cosolvents) and processing steps. However, suitable additives may also be incorporated into these inkjet ink compositions to impart a number of desired properties while maintaining the stability of the compositions. For example, surfactants may be added to further enhance the colloidal stability of the composition. Other additives are well known in the art and include humectants, biocides and fungicides, binders such as polymeric binders, pH control agents, drying accelerators, penetrants, and the like. The amount of a particular additive will vary depending on a variety of factors but are generally present in an amount ranging between 0% and 40% based on the weight of the inkjet ink composition. Additionally, the inkjet ink compositions of the present invention may further incorporate dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, lithium salts, and the like. It is also within the bounds of the present invention to use a mixture of the modified pigments described herein and unmodified pigments, other modified pigments, or both.

As a particularly preferred optional component, the inkjet ink composition of the present invention may further comprise a cosolvent. A variety of different cosolvents may be used. Preferably, the cosolvent is soluble or miscible in water at concentrations of at least 10% by weight and is also chemically stable to aqueous hydrolysis conditions (i.e., reaction with water under heat aging conditions, described in more detail below, including, for example, the hydrolysis of esters and lactones). Furthermore, the cosolvent preferably has a dielectric constant below that of water, including from about 10 to about 78 at 20° C. Examples of suitable cosolvents include low molecular-weight glycols (such as ethylene glycol, diethylene glycol, triethylene glycol, tetraethylene glycol, dipropylene glycol, ethylene glycol monomethyl ether, ethylene glycol monoethyl ether, triethylene glycol monomethyl or monoethyl ether, diethylene glycol monomethyl ether, diethylene glycol monoethyl ether, diethylene glycol monobutyl ether, and tetraethylene glycol monobutyl ether); alcohols (such as ethanol, propanol, iso-propyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cyclopropanol); diols containing from about 2 to about 40 carbon atoms (such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol), 1,3-propanediol, 1,4-butanediol, 1,5-pentanediol, 1,6-hexanediol, 1,2,6-hexanetriol, and poly(ethylene-co-propylene) glycol, as well as their reaction products with alkylene oxides, including ethylene oxides, including ethylene oxide and propylene oxide); triols containing from about 3 to about 40 carbon atoms (such as glycerine (glycerol), trimethylolethane, trimethylolpropane, 1,3,5-pentanetriol, 1,2,6-hexanetriol, and the like as well as their reaction products with alkylene oxides, including ethylene oxide, propylene oxide, and mixtures thereof); polyols (such as pentaerythritol); amides (such as dimethyl formaldehyde and dimethyl acetamide); ketones or ketoalcohols (such as acetone and diacetone alcohol); ethers (such as tetrahydrofuran and dioxane); lactams (such as 2-pyrrolidone, N-methyl-2-pyrrolidone, and $\in$-caprolactam); ureas or urea derivatives (such as di-(2-hydroxyethyl)-5,5,-dimethyl hydantoin (dantacol) and 1,3-dimethyl-2-imidazolidinone); inner salts (such as betaine); and hydroxyamide derivatives (such as acetylethanolamine, acetylpropanolamine, propylcarboxyethanolamine, and propylcarboxy propanolamine, as well as their reaction products with alkylene oxides). Additional examples include saccharides (such as maltitol, sorbitol, gluconolactone and maltose); sulfoxide derivatives (symmetric and asymmetric) containing from about 2 to about 40 carbon atoms (such as dimethylsulfoxide, methylethylsulfoxide, and alkylphenyl sulfoxides); and sulfone derivatives (symmetric and asymmetric) containing from about 2 to about 40 carbon atoms (such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, and dimethylsulfolane). These materials may be used alone or in combination.

The amount of the cosolvent can be varied depending on a variety of factors, including the properties of the cosolvent (solubility and/or dielectric constant), the type of modified pigment, and the desired performance of the resulting inkjet ink composition. In particular, the optional cosolvent may be used in amounts of less than or equal to about 40% by weight based on the total weight of the inkjet ink composition, including less than or equal to about 30% and less than or equal to about 20%. Also, when used, the amount of the optional cosolvent is greater than or equal to about 2% by weight based on the total weight of the inkjet ink composition, including greater than or equal to about 5% and greater than or equal to about 10% by weight. In a preferred embodiment of the present invention, the inkjet ink composition comprises from about 10% to about 40% by weight cosolvent, including from about 10% to about 20% by weight, which has been found to provide improved properties, in particular, improved conductivity, discussed in more detail below.

It has surprisingly been found that aqueous dispersions, and, in particular, aqueous inkjet ink compositions, comprising a modified pigment having an attached salt of a bisphosphonic acid group with a corresponding quaternary ammonium counterion, preferably a quaternary alkyl ammonium counterion, having the structure defined above, optionally further comprising a cosolvent, have improved properties compared to aqueous dispersion and inkjet ink compositions comprising a modified pigment having a different attached salt of a bisphosphonic acid group. In particular, it has been found that the use of these cationic counterions and cosolvents, produces a composition that has low electrical conductivity, and, more surprisingly, that this conductivity remains low even after thermal aging. For example, it has been found that an inkjet ink composition of the present invention, comprising a modified pigment with the corresponding cationic counterion described above, has a conductivity of less than or equal to 1000 microsiemens/cm, preferably less than or equal to 750 microsiemens/cm, and more preferably less than or equal to 500 microsiemens/cm, at a modified pigment content of from 10% to 15% by weight. Furthermore, the conductivity remains less than or equal to 1000 microsiemens/cm after 4 weeks at 60° C., at the same modified pigment content of from 10% to 15% by weight.

It has also surprisingly been found that the aqueous dispersions and aqueous inkjet ink compositions described above additionally have a low level of soluble phosphate ion in the liquid phase after thermal aging. For example, it has been found that an inkjet ink composition of the present invention, comprising a modified pigment with the corresponding cationic counterion described above, has a concentration of phosphate ion of less than or equal to 400 ppm, preferably less than or equal to 300 ppm, at a modified pigment content of from 10% to 15% by weight. The amount of phosphate ion can be determined using any method known in the art, including, for example, ion chromatography.

While not wishing to be bound by any particular theory, it is believed that the use of the specific cationic counterions, particularly in combination with the specific types of cosolvents, provides additional stability to the attached bisphosphonic acid group, suppressing any tendency for these group to release phosphate ions. Thus, increased chemical stability results in lower levels of soluble ions during aging, which, in turn, results in lower conductivity levels after aging. Low and stable conductivity is an important property for a variety of types of inkjet ink printing, but is particularly useful for inkjet ink compositions printed using a piezoelectric printhead, including those using a shear mode printhead since such printers are more susceptible to ionic concentration.

Thus, the present invention further relates to an inkjet ink composition, particularly a piezoelectric inkjet ink composition, comprising at least one modified pigment, wherein the modified pigment comprises a pigment having attached at least one salt of a geminal bisphosphonic acid group or partial esters thereof and wherein the inkjet ink composition has a conductivity of less than or equal to 1000 microsiemens/cm at a modified pigment content of from 10% to 15% by weight and further has a conductivity of less than or equal to 1000 microsiemens/cm after 4 weeks at 60° C. at a modified pigment content of from 10% to 15% by weight. Preferably, the inkjet ink composition comprises a cosolvent in an amount of from about 10% to about 40% by weight based on the total weight of the inkjet ink composition and more preferably in an amount from about 10% to about 20% by weight based on the total weight of the inkjet ink composition. In addition, preferably, the salt of the geminal bisphosphonic acid group or partial esters thereof have a corresponding quaternary ammonium counterion, preferably a quaternary alkyl ammonium counterion, with the structure $NR'_4{}^+$, wherein R' is as defined above, and wherein the quaternary ammonium counterion has at least 6 total carbons.

Furthermore, the present invention also relates to a method of reducing the conductivity increase of an aqueous modified pigment dispersion or inkjet ink composition after thermal aging, wherein the modified pigment comprises a pigment having attached at least one salt of a geminal bisphosphonic acid group or partial esters thereof. The method comprises the step of converting the salt of this modified pigment, such as by ion exchange, to a quaternary ammonium counterion having the structure $NR'_4{}^+$, wherein R' is as defined above, and wherein the quaternary ammonium counterion has at least 6 total carbons. Optionally, a cosolvent is added. This modified pigment is then optionally heat aged, such as at a temperature of from 50° C. to 100° C. for a time between 0.5 and 5 days, forming an aqueous modified pigment dispersion further comprising desorbed ions, including soluble phosphate ions as well as other ions unattached ions, from which the desorbed ions are then removed, using any method known in the art, such as diafiltration/ultrafiltration. The resulting ion exchanged and, optionally, heat aged aqueous modified pigment dispersion, which has attached the specified quaternary ammonium salt of a geminal bisphosphonic acid group or partial ester thereof, has been found to have a reduced conductivity increase. That is, upon further aging, the conductivity of a dispersion having a modified pigment content of 10% to 15% by weight, remains below 1000 microsiemens/cm, preferably less than or equal to 750 microsiemens/cm, and more preferably less than or equal to 500 microsiemens/cm.

The present invention will be further clarified by the following examples, which are intended to be only exemplary in nature.

EXAMPLES

Examples 1-3 and Comparative Example 1-3

The following examples relate to an embodiment of the present invention in which the modified pigment comprises a carbon black pigment having attached at least one salt of a geminal bisphosphonic acid group having a corresponding quaternary alkyl ammonium counterion. These examples further relate to an embodiment in which a glycerol cosolvent is used.

For Examples 1-3, the cationic counterion of the modified pigment was tetraethylammonium (TEA$^+$), and this modified pigment was prepared by ion exchange of Cab-O-Jet™ 400 colored pigment dispersion, which is a 15% solids aqueous dispersion of a carbon black pigment having attached a sodium salt of a geminal bisphosphonic acid group, using the following general ion exchange procedure.

Step 1: Activation of Ion Exchange Resin 1200 mL of NRW160 (a strong acid ion exchange resin available from Purolite, Bala Cynwyd, Pa., USA, having a capacity of 2.1 mmol/mL) were placed on a 45 micron sieve and rinsed with 2 L of DI water. This was then transferred to a beaker and mixed with 2 L of DI water using an overhead stirrer. To this dispersion 1160 g of 40% tetraethylammonium hydroxide was added slowly over 3 hours. The activation was allowed to continue overnight. The resin was then sieved and washed with DI water until the pH was less than 10 to form TEA-activated NRW160.

Step 2: Ion exchange of Modified Pigment 335 mL of the TEA-activated NRW160 was added to 1000 mL of Cab-O-Jet™ 400 colored pigment dispersion. The mixture was stirred for 2 hours, after which the resin was separated from the dispersion by filtration. The sodium number was measured using an ion selective electrode to check the efficiency of the exchange. An exchange efficiency of >95% is typically produced using this method (thus, less than 500 ppm of Na remains in the dispersion). The resulting ion exchanged dispersion was then diafiltered using 5 volumes of water, and the dispersion concentrated to 15% solids (the solids content of the dispersion was determined by drying a small amount of the dispersion at 110° C. in an oven for 1 hour).

For Comparative Examples 1-3, the modified pigment was the starting Cab-O-Jet™ 400 colored pigment dispersion used to prepare the modified pigments of Examples 1-3, and therefore had a sodium counterion. This dispersion was diafiltered using 5 volumes of water and concentrated to 15% solids.

The dispersions for each example were prepared by combining 85 g of the 15% by weight modified pigment dispersion and 15 g of the appropriate amount of water and/or glycerol. For Example 1 and Comparative Example 1, 15 g of water was added (0% glycerol), for Example 2 and Comparative Example 2), 10 g of glycerol and 5 g of water were added (10% glycerol), and for Example 3 and Comparative Example 3, 15 g of glycerol was added (15% glycerol). The description of each dispersion used for each example, which all had a solids content of 12.75%, is shown in Table 1 below.

TABLE 1

| Example # | Counterion | % Glycerol |
|---|---|---|
| Ex 1 | TEA$^+$ | 0% |
| Ex 2 | TEA$^+$ | 10% |
| Ex 3 | TEA$^+$ | 15% |
| Comp Ex 1 | Na$^+$ | 0% |
| Comp Ex 2 | Na$^+$ | 10% |
| Comp Ex 3 | Na$^+$ | 15% |

The electrical conductivity of each dispersion was measured at room temperature using a Thermal Orion conductivity meter, calibrated with KCl standard solutions. Also, each dispersion was placed in a Nalgene bottle and aged at 60° C. in an oven, and the conductivity was measured after various lengths of time. The results are shown in Table 2 below and are also shown graphically in FIG. 1.

TABLE 2

| | Conductivity (microsiemens/cm) | | | | |
|---|---|---|---|---|---|
| Example # | 0 weeks | 1 week | 2 weeks | 3 weeks | 4 weeks |
| Ex 1 | 334 | 612 | 643 | 720 | 699 |
| Ex 2 | 264 | 504 | 530 | 600 | 561 |
| Ex 3 | 230 | 430 | 460 | 512 | 476 |
| Comp Ex 1 | 349 | 1361 | 1678 | 1909 | 1867 |
| Comp Ex 2 | 291 | 914 | 1131 | 1388 | 1372 |
| Comp Ex 3 | 260 | 830 | 1002 | 1203 | 1169 |

As the results show, the dispersions of Comparative Examples 1-3, comprising modified pigments having attached the sodium salt of a geminal bisphosphonic acid group, initially had a conductivity of less than 1000 microsiemens/cm. However, upon aging, the conductivity increased to greater than 1000 microsiemens/cm after 4 weeks. By comparison, dispersions comprising modified pigments having attached a quaternary alkyl ammonium salt of the same geminal bisphosphonic acid group (Examples 1-3), had a similar starting conductivity, but these dispersions did not show a marked increase in conductivity during aging. The dispersions of Examples 1-3 all had an electrical conductivity significantly less than 1000 microsiemens/cm (less than 750 microsiemens/cm) after 4 weeks of aging. In addition, the dispersions of Examples 2 and 3, which further comprised glycerol as a cosolvent, showed additional suppression of the increase in conductivity upon aging. As the amount of cosolvent increased, the conductivity of the dispersion after 4 weeks of aging was lower (approximately 500 microsiemens/cm). While this was also seen in the comparative dispersions—the dispersions of Comparative Examples 2 and 3, which contained glycerol, had a lower conductivity after 4 weeks of aging than the dispersion of Comparative Example 1—none of these comparative dispersions had a conductivity of less than or equal to 1000 microsiemens/cm.

Furthermore, the concentration of phosphate ions was also determined for each of these aqueous dispersions after 4 weeks of aging by spinning down samples of the dispersions using ultrahigh speed centrifugation and measuring the amount of phosphate ion in the supernatant by ion chromatograph (IC). The results are shown in Table 3 below.

TABLE 3

| Example # | Phosphate ion concentration (ppm) |
|---|---|
| Ex 1 | 278 |
| Ex 2 | 247 |
| Ex 3 | 214 |
| Comp Ex 1 | 668 |
| Comp Ex 2 | 504 |
| Comp Ex 3 | 484 |

As the results show, the dispersions of Examples 1-3, comprising modified pigments having attached a quaternary alkyl ammonium salt of a geminal bisphosphonic acid group, had significantly lower phosphate ion concentrations after 4 weeks of aging compared to the dispersions of Comparative Examples 1-3 (having a sodium counterion). Furthermore, addition of the glycerol cosolvent was also found to further reduce the concentration of phosphate ions after aging.

Since the dispersions of Examples 1-3 showed a very low conductivity and a low phosphate ion concentration that is maintained upon aging, it would be expected that these dispersions could be used to prepare black inkjet ink compositions having good conductivity properties, which would be particularly useful in piezoelectric inkjet printing, including those using a shear mode printhead.

Examples 4-6 and Comparative Example 4

The following examples relate to an embodiment of the present invention in which the modified pigment comprises a magenta pigment having attached at least one salt of a geminal bisphosphonic acid group having a corresponding quaternary alkyl ammonium counterion. These examples further relate to an embodiment in which a glycerol cosolvent is used.

For Examples 4-6, the cationic counterion of the modified pigment was tetraethylammonium (TEA$^+$), and this modified pigment was prepared by ion exchange of Cab-O-Jet™ 465 colored pigment dispersion, which is a 15% solids aqueous dispersion of a magenta pigment having attached a sodium salt of a geminal bisphosphonic acid group, using the general ion exchange procedure described in Examples 1-3. For Comparative Example 4, the modified pigment was the starting Cab-O-Jet™ 465 colored pigment dispersion used to prepare the modified pigments of Examples 4-6, and therefore had a sodium counterion. The dispersions for each example were prepared as described in Examples 1-3 and Comparative Examples 1-3. The description of each dispersion used for each example, which all had a solids content of 12.75%, is shown in Table 4 below.

TABLE 4

| Example # | Counterion | % Glycerol |
|---|---|---|
| Ex 4 | TEA$^+$ | 0% |
| Ex 5 | TEA$^+$ | 10% |
| Ex 6 | TEA$^+$ | 15% |
| Comp Ex 4 | Na$^+$ | 0% |

Figure 2:
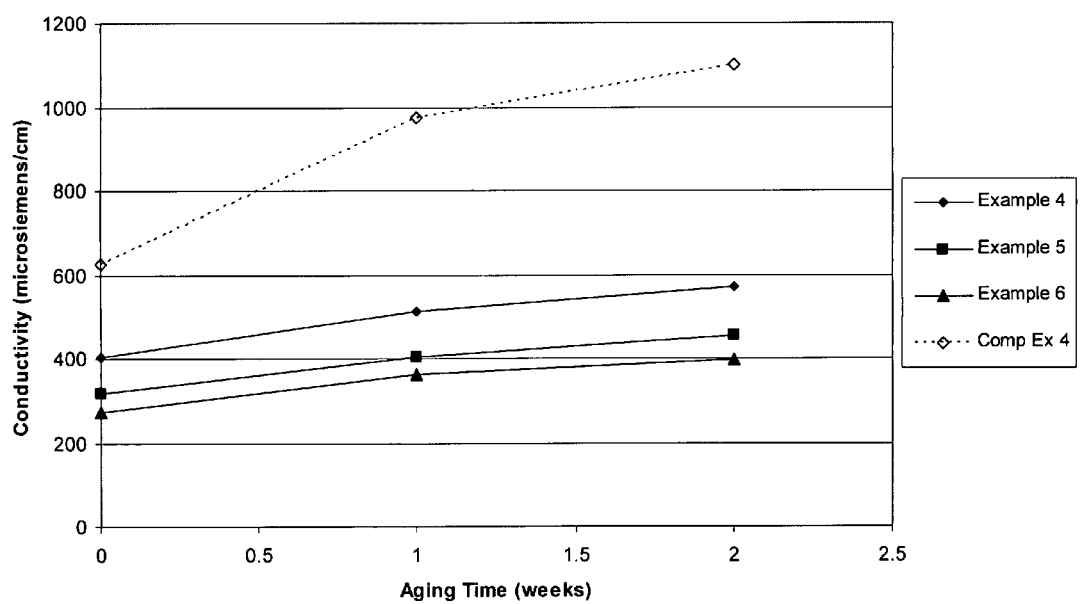

The electrical conductivity of each dispersion was measured at room temperature using a Thermal Orion conductivity meter, calibrated with KCl standard solutions. Also, each dispersion was placed in a Nalgene bottle and aged at 60° C. in an oven, and the conductivity was measured after various lengths of time. The results are shown in Table 5 below and are also shown graphically in FIG. 2.

TABLE 5

| | Conductivity (microsiemens/cm) | | |
|---|---|---|---|
| Example # | 0 weeks | 1 week | 2 weeks |
| Ex 4 | 404 | 512 | 571 |
| Ex 5 | 317 | 404 | 454 |
| Ex 6 | 275 | 364 | 398 |
| Comp Ex 4 | 627 | 973 | 1100 |

As the results show, the dispersion of Comparative Example 4, comprising a modified pigment having attached the sodium salt of a geminal bisphosphonic acid group, initially had a low conductivity. However, upon aging, the conductivity increased significantly over 2 weeks, and it would be expected that, after 4 weeks, an even greater increase in conductivity would be observed. By comparison, dispersions comprising modified pigments having attached a quaternary alkyl ammonium salt of the same geminal bisphosphonic acid group (Examples 4-6) also had a very low initial conductivity, but these dispersions did not show a marked increase in conductivity during aging. The dispersions of Examples 4-6 all had an electrical conductivity significantly less than 750 microsiemens/cm after 2 weeks of aging, and it would be expected that these values would not increase much more after 4 weeks of aging. In addition, the dispersions of Examples 5 and 6, which further comprised glycerol as a cosolvent, showed additional suppression of the increase in conductivity upon aging. As the amount of cosolvent increased, the conductivity of the dispersion after 2 weeks of aging was lower (approximately 500 microsiemens/cm).

Since the dispersions of Examples 4-6 showed very low conductivity that is maintained upon aging, it would be expected that these dispersions could be used to prepare magenta inkjet ink compositions having good conductivity properties, which would be particularly useful in piezoelectric inkjet printing, including those which use a shear mode printhead.

Examples 7-8

The following examples relate to an embodiment of the present invention in which the modified pigment comprises a magenta pigment having attached at least one salt of a geminal bisphosphonic acid group and further comprises a cosolvent in an amount of from 10% to 40% by weight based on the total weight of the inkjet ink composition.

For these examples, the modified pigment was Cab-O-Jet™ 465 colored pigment dispersion, used to prepare the modified pigments of Examples 4-6, and therefore had a sodium counterion, and the dispersions were prepared as described in Examples 4-6 and Comparative Examples 4. The description of each dispersion used for each example, which all had a solids content of 12.75%, is shown in Table 6 below.

TABLE 6

| Example # | Counterion | % Glycerol |
|---|---|---|
| Ex 7 | Na$^+$ | 10% |
| Ex 8 | Na$^+$ | 15% |
| Comp Ex 4 | Na$^+$ | 0% |

Figure 3:
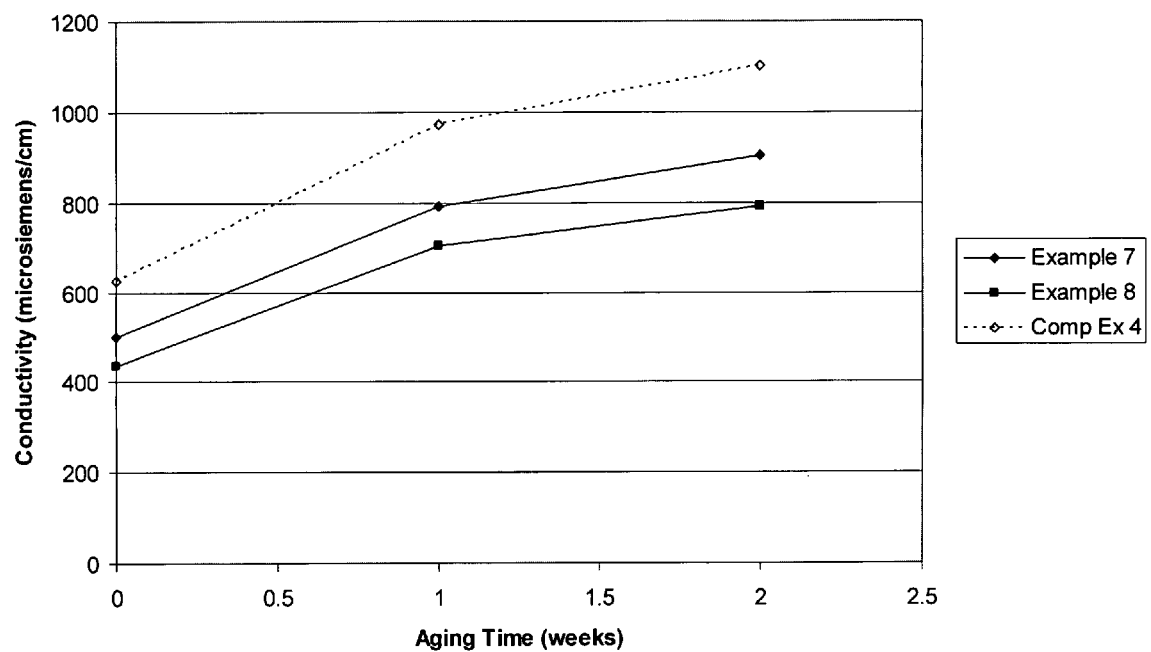

The electrical conductivity of each dispersion was measured at room temperature using a Thermal Orion conductivity meter, calibrated with KCl standard solutions. Also, each dispersion was placed in a Nalgene bottle and aged at 60° C. in an oven, and the conductivity was measured after various lengths of time. The results are shown in Table 7 below and are also shown graphically in FIG. 3.

TABLE 7

| Example # | Conductivity (microsiemens/cm) | | |
|---|---|---|---|
| | 0 weeks | 1 week | 2 weeks |
| Ex 7 | 499 | 793 | 904 |
| Ex 8 | 436 | 702 | 792 |
| Comp Ex 4 | 627 | 973 | 1100 |

As the results show, the dispersion of Comparative Example 4, comprising a modified pigment having attached the sodium salt of a geminal bisphosphonic acid group, initially had a low conductivity. However, upon aging, the conductivity increased significantly over 2 weeks, and it would be expected that, after 4 weeks, an even greater increase in conductivity would be observed. By comparison, dispersions comprising the same modified pigment and further comprising a cosolvent (Examples 7-8) also had a very low initial conductivity, but these dispersions did not show a marked increase in conductivity during aging. The dispersions of Examples 7-8 all had an electrical conductivity of less than 1000 microsiemens/cm after 2 weeks of aging, and it would be expected that these values would not increase to greater than 1000 microsiemens/cm after 4 weeks of aging.

Since the dispersions of Examples 7-8 showed very low conductivity that is maintained upon aging, it would be expected that these dispersions could be used to prepare magenta inkjet ink compositions having good conductivity properties, which would be particularly useful in piezoelectric inkjet printing, including those which use a shear mode printhead.

Examples 9-15 and Comparative Examples 5-11

The following examples relate to an embodiment of the present invention in which the modified pigment comprises a carbon black pigment having attached at least one salt of a geminal bisphosphonic acid group having a corresponding quaternary alkyl ammonium counterion and some further comprising various types of cosolvents.

For Examples 9-15, the cationic counterion of the modified pigment was tetraethylammonium (TEA$^+$), and this modified pigment was prepared by ion exchange of Cab-O-Jet™ 400 colored pigment dispersion, which is a 15% solids aqueous dispersion of a carbon black pigment having attached a sodium salt of a geminal bisphosphonic acid group, using the general ion exchange procedure described in Examples 1-3. For Comparative Examples 5-11, the modified pigment was the starting Cab-O-Jet™ 400 colored pigment dispersion used to prepare the modified pigments of Examples 9-15, and therefore had a sodium counterion. In addition, for Examples 10-15 and Comparative Examples 6-11, the dispersions further comprised 10% by weight of a cosolvent, based on the total weight of the dispersion, and were prepared as described in Examples 2 and Comparative Example 2, with different cosolvents being used. The description of each dispersion used for each example, which all had a solids content of 12.75%, is shown in Table 8 below. In this table, TEGMBE is tetraethyleneglycol monobutyl ether and dantacol is di-(2-hydroxyethyl)-5,5-dimethyl hydantoin.

TABLE 8

| Example # | Counterion | Cosolvent |
|---|---|---|
| Ex 9 | TEA$^+$ | none |
| Ex 10 | TEA$^+$ | 1,2-hexanediol |
| Ex 11 | TEA$^+$ | TEGMBE |
| Ex 12 | TEA$^+$ | 2-pyrrolidone |
| Ex 13 | TEA$^+$ | dantacol |
| Ex 14 | TEA$^+$ | 1,3-dimethyl-2-imidazolidinone |
| Ex 15 | TEA$^+$ | glycerol |
| Comp Ex 5 | Na$^+$ | none |
| Comp Ex 6 | Na$^+$ | 1,2-hexanediol |
| Comp Ex 7 | Na$^+$ | TEGMBE |
| Comp Ex 8 | Na$^+$ | 2-pyrrolidone |
| Comp Ex 9 | Na$^+$ | dantacol |
| Comp Ex 10 | Na$^+$ | 1,3-dimethyl-2-imidazolidinone |
| Comp Ex 11 | Na$^+$ | glycerol |

The electrical conductivity of each dispersion was measured as described in Examples 1-3 above, and each dispersion was also aged as described in Examples 1-3. The results are shown in Table 9 below.

TABLE 9

| Example # | Conductivity (microsiemens/cm) | | | | |
|---|---|---|---|---|---|
| | 0 weeks | 1 week | 2 weeks | 3 weeks | 4 weeks |
| Ex 9 | 347 | 659 | 741 | 813 | 872 |
| Ex 10 | 320 | 603 | 649 | 674 | 704 |
| Ex 11 | 354 | 695 | 728 | 755 | 765 |
| Ex 12 | 335 | 683 | 725 | 770 | 810 |
| Ex 13 | 340 | 652 | 696 | 744 | 773 |
| Ex 14 | 400 | 735 | 791 | 845 | 855 |
| Ex 15 | 280 | 545 | 586 | 634 | 665 |
| Comp Ex 5 | 541 | 1280 | 1647 | 1893 | 2060 |
| Comp Ex 6 | 412 | 869 | 1088 | 1201 | 1277 |
| Comp Ex 7 | 499 | 992 | 1139 | 1215 | 1265 |
| Comp Ex 8 | 345 | 953 | 1054 | 1145 | 1236 |
| Comp Ex 9 | 386 | 888 | 1031 | 1129 | 1212 |
| Comp Ex 10 | 410 | 817 | 888 | 981 | 1045 |
| Comp Ex 11 | 321 | 795 | 944 | 1083 | 1169 |

As the results show, the dispersions of Comparative Examples 5-11, comprising modified pigments having attached the sodium salt of a geminal bisphosphonic acid group, and further comprising various cosolvents, initially had a conductivity of less than 1000 microsiemens/cm. However, upon aging, the conductivity increased to greater than 1000 microsiemens/cm after 4 weeks. By comparison, dispersions comprising modified pigments having attached a quaternary alkyl ammonium salt of the same geminal bisphosphonic acid group (Examples 9-15), had a similar starting conductivity, but these dispersions did not show a marked increase in conductivity during aging. The dispersions of Examples 9-15 all had an electrical conductivity significantly less than 1000 microsiemens/cm. Furthermore, the dispersions of Examples 10-15, each further comprising a cosolvent, had an electrical conductivity after 4 weeks of aging that was less than the electrical conductivity of Example 9. Thus, addition of these cosolvents provided a further suppression of the increase in conductivity upon aging. In particular, for Examples 10 and 15, wherein the cosolvent was 1,2-hexanediol and glycerol respectively, the electrical conductivity was less than 750 microsiemens/cm after 4 weeks of aging.

Since the dispersions of Examples 9-15 showed a very low conductivity that is maintained upon aging, it would be expected that these dispersions could be used to prepare black inkjet ink compositions having good conductivity properties, which would be particularly useful in piezoelectric inkjet printing, including those using a shear mode printhead.

Example 16 and Comparative Examples 12-13

For Example 16, a dispersion of a modified pigment comprising a carbon black pigment having attached a tetraethylammonium (TEA$^+$) salt of a geminal bisphosphonic acid group was prepared as described in Example 1 above. For Comparative Examples 12-13, a dispersion of a modified pigment comprising a carbon black pigment having attached a tetramethylammonium (TMA$^+$) salt of a geminal bisphosphonic acid group was prepared by ion exchange of Cab-O-Jet™ 400 colored pigment dispersion, which is a 15% solids aqueous dispersion of a carbon black pigment having attached a sodium salt of a geminal bisphosphonic acid group, using the general ion exchange procedure described in Examples 1-3, with the exception that tetramethylammonium hydroxide was used in place of tetraethylammonium hydroxide. No cosolvent was added.

The electrical conductivity of each dispersion was measured as described in Examples 1-3 above, and each dispersion was also aged as described in Examples 1-3. The results are shown in Table 10 below.

TABLE 10

| Example # | Conductivity (microsiemens/cm) | | | | |
|---|---|---|---|---|---|
| | 0 weeks | 1 week | 2 weeks | 3 weeks | 4 weeks |
| Ex 16 | 319 | 589 | 771 | n/a | 959 |
| Comp Ex 12 | 418 | 1088 | 1423 | n/a | 1738 |
| Comp Ex 13 | 455 | 1096 | 1513 | n/a | 1803 | n/a = not available

As the results show, for the dispersions of Comparative Examples 12 and 13, comprising modified pigments having attached the tetramethylammonium salt (which do not have at least 6 total carbon atoms) of a geminal bisphosphonic acid group, the conductivity increased significantly upon aging over 4 weeks. By comparison, the dispersion of Example 16, comprising a modified pigment having attached a tetraethylammonium salt (which does have at least 6 total carbon atoms) of the same geminal bisphosphonic acid group had a very low initial conductivity, but this dispersion did not show a marked increase in conductivity during aging. The dispersion of Examples 16 had an electrical conductivity of less than 1000 microsiemens/cm after 4 weeks of aging.

Since the dispersion of Example 16 showed a very low conductivity that is maintained upon aging, it would be expected that this dispersion could be used to prepare a black inkjet ink composition having good conductivity properties, which would be particularly useful in piezoelectric inkjet printing, including those using a shear mode printhead.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An inkjet ink composition comprising
   a) a liquid vehicle,
   b) an optional cosolvent, and
   c) at least one modified pigment comprising a pigment having attached at least one salt of a geminal bisphosphonic acid group or partial esters thereof having a corresponding quaternary ammonium counterion having the structure NR'$_4^+$, wherein R', which can be the same or different, is a C$_2$-C$_6$ alkyl group,
   and wherein the quaternary ammonium counterion has at least 6 total carbons.

2. The inkjet ink composition of claim 1, wherein the inkjet ink composition has a conductivity of less than or equal to 1000 microsiemens/cm at a modified pigment content of from 10% to 15% by weight.

3. The inkjet ink composition of claim 1, wherein the inkjet ink composition has a conductivity of less than or equal to 750 microsiemens/cm at a modified pigment content of from 10% to 15% by weight.

4. The inkjet ink composition of claim 1, wherein the inkjet ink composition has a conductivity of less than or equal to 500 microsiemens/cm at a modified pigment content of from 10% to 15% by weight.

5. The inkjet ink composition of claim 2, wherein the inkjet ink composition further has a conductivity of less than or equal to 1000 microsiemens/cm after 4 weeks at 60° C. at a modified pigment content of from 10% to 15% by weight.

6. The inkjet ink composition of claim 1, wherein the inkjet ink composition has a concentration of phosphate ion of less than or equal to 400 ppm at a modified pigment content of from 10% to 15% by weight.

7. The inkjet ink composition of claim 1, wherein the inkjet ink composition has a concentration of phosphate ion of less than or equal to 300 ppm at a modified pigment content of from 10% to 15% by weight.

8. The inkjet ink composition of claim 1, wherein the organic group comprises a salt of a group having the formula —CQ(PO$_3$H$_2$)$_2$, wherein Q is H, R, OR, SR, or NR$_2$, wherein R, which can be the same or different, is H, a C1-C18 alkyl group, a C1-C18 acyl group, an aralkyl group, an alkaryl group, or an aryl group.

9. The inkjet ink composition of claim 1, wherein the organic group comprises a salt of a group having the formula —(CH$_2$)$_n$—CQ(PO$_3$H$_2$)$_2$, wherein n is 1 to 3.

10. The inkjet ink composition of claim 1, wherein the organic group comprises a salt of a group having the formula —CR(PO$_3$H$_2$)$_2$ or partial esters thereof, wherein R is H or a C1-C6 alkyl group.

11. The inkjet ink composition of claim 1, wherein the organic group comprises a salt of a group having the formula —CO-Q-CH(PO$_3$H$_2$)$_2$ or —SO$_2$-Q-CH(PO$_3$H$_2$)$_2$ or partial esters thereof, wherein Q is O, S, or NR' and R' is H, a C1-C18 alkyl group, a C1-C18 acyl group, an aralkyl group, an alkaryl group, or an aryl group.

12. The inkjet ink composition of claim 11, wherein Q is NH.

13. The inkjet ink composition of claim 1, wherein the organic group comprises a salt of a group having the formula —X—CO-Q-CH(PO$_3$H$_2$)$_2$ or —X—SO$_2$-Q-CH(PO$_3$H$_2$)$_2$, partial esters thereof, or salts thereof, wherein X, which is attached to the pigment, is an arylene, heteroarylene, alkylene, alkarylene, or aralkylene group.

14. The inkjet ink composition of claim 13, wherein X is an arylene group.

15. The inkjet ink composition of claim 13, wherein Q is NH.

16. The inkjet ink composition of claim 1, wherein the organic group is a —$C_6H_4$—CONHCH($PO_3H_2$)$_2$ group, a —$C_6H_4$—$SO_2$NHCH($PO_3H_2$)$_2$ group, partial esters thereof, or salts thereof.

17. The inkjet ink composition of claim 1, wherein the pigment comprises a blue pigment, a black pigment, a brown pigment, a cyan pigment, a green pigment, a white pigment, a violet pigment, a magenta pigment, a red pigment, an orange pigment, a yellow pigment, or mixtures thereof.

18. The inkjet ink composition of claim 1, wherein the pigment is carbon black.

19. The inkjet ink composition of claim 1, wherein the liquid vehicle is an aqueous vehicle.

20. The inkjet ink composition of claim 1, wherein the cosolvent is 1,2-hexanediol, tetraethylene glycol monobutyl ether, 2-pyrrolidone, di-(2-hydroxyethyl)-5,5-dimethyl hydantoin, 1,3-dimethyl-2-imidazolidinone, or glycerol.

21. The inkjet ink composition of claim 1, wherein the cosolvent is 1,2-hexanediol or glycerol.

22. An inkjet ink composition comprising
a) a liquid vehicle,
b) a cosolvent in an amount of from 10% to 40% by weight based on the total weight of the inkjet ink composition, and
c) at least one modified pigment comprising a pigment having attached at least one salt of a geminal bisphosphonic acid group or partial esters thereof having a corresponding quaternary ammonium counterion having the structure $NR'_4{}^+$, wherein at least one R', which can be the same or different, is a $C_2$-$C_6$ alkyl group, and wherein the quaternary ammonium counterion has at least 6 total carbons,
wherein the inkjet ink composition has a conductivity of less than or equal to 1000 microsiemens/cm at a modified pigment content of from 10% to 15% by weight and further has a conductivity of less than or equal to 1000 microsiemens/cm after 4 weeks at 60° C. at a modified pigment content of from 10% to 15% by weight.

23. A modified pigment comprising a pigment having attached at least one salt of a geminal bisphosphonic acid group or partial esters thereof having a corresponding quaternary ammonium counterion having the structure $NR'_4{}^+$, wherein at least one R', is a $C_2$-$C_6$ alkyl group, and wherein the quaternary alkyl ammonium counterion has at least 6 total carbons.

24. The modified pigment of claim 23, wherein the modified pigment is in the form of an aqueous dispersion.

25. The modified pigment of claim 24, wherein the aqueous dispersion has a conductivity of less than or equal to 1000 microsiemens/cm at a modified pigment content of from 10% to 15% by weight.

26. The modified pigment of claim 24, wherein the aqueous dispersion has a conductivity of less than or equal to 750 microsiemens/cm at a modified pigment content of from 10% to 15% by weight.

27. The modified pigment of claim 24, wherein the aqueous dispersion has a conductivity of less than or equal to 500 microsiemens/cm at a modified pigment content of from 10% to 15% by weight.

28. The modified pigment of claim 25, wherein the aqueous dispersion further has a conductivity of less than or equal to 1000 microsiemens/cm after 4 weeks at 60° C. at a modified pigment content of from 10% to 15% by weight.

29. The modified pigment of claim 25, wherein the aqueous dispersion has a concentration of phosphate ion of less than or equal to 400 ppm at a modified pigment content of from 10% to 15% by weight.

30. The modified pigment of claim 25, wherein the aqueous dispersion has a concentration of phosphate ion of less than or equal to 300 ppm at a modified pigment content of from 10% to 15% by weight.

31. The modified pigment of claim 23, wherein the organic group comprises a salt of a group having the formula —CQ($PO_3H_2$)$_2$, wherein Q is H, R, OR, SR, or $NR_2$, wherein R, which can be the same or different, is H, a C1-C18 alkyl group, a C1-C18 acyl group, an aralkyl group, an alkaryl group, or an aryl group.

32. The modified pigment of claim 23, wherein the organic group comprises a salt of a group having the formula —($CH_2$)$_n$—CQ($PO_3H_2$)$_2$, wherein n is 1 to 3.

33. The inkjet ink composition of claim 23, wherein the organic group comprises a salt of a group having the formula —CR($PO_3H_2$)$_2$ or partial esters thereof, wherein R is H or a C1-C6 alkyl group.

34. The inkjet ink composition of claim 23, wherein the organic group comprises a salt of a group having the formula —CO-Q-CH($PO_3H_2$)$_2$ or —$SO_2$-Q-CH($PO_3H_2$)$_2$ or partial esters thereof, wherein Q is O, S, or NR' and R' is H, a C1-C18 alkyl group, a C1-C18 acyl group, an aralkyl group, an alkaryl group, or an aryl group.

35. The modified pigment of claim 34, wherein Q is NH.

36. The modified pigment of claim 23, wherein the organic group comprises a salt of a group having the formula —X—CO-Q-CH($PO_3H_2$)$_2$ or —X—$SO_2$-Q-CH($PO_3H_2$)$_2$, partial esters thereof, or salts thereof, wherein X, which is attached to the pigment, is an arylene, heteroarylene, alkylene, alkarylene, or aralkylene group.

37. The modified pigment of claim 36, wherein X is an arylene group.

38. The modified pigment of claim 36, wherein Q is NH.

39. The modified pigment of claim 23, wherein the organic group is a —$C_6H_4$—CONHCH($PO_3H_2$)$_2$ group, a —$C_6H_4$—$SO_2$NHCH($PO_3H_2$)$_2$ group, partial esters thereof, or salts thereof.

40. The modified pigment of claim 23, wherein the pigment comprises a blue pigment, a black pigment, a brown pigment, a cyan pigment, a green pigment, a white pigment, a violet pigment, a magenta pigment, a red pigment, an orange pigment, a yellow pigment, or mixtures thereof.

41. The modified pigment of claim 23, wherein the pigment is carbon black.

42. A method of reducing the conductivity increase of an aqueous modified pigment dispersion comprising the steps of:
i) providing an aqueous dispersion of a modified pigment comprising a pigment having attached at least one salt of a geminal bisphosphonic acid group or partial esters thereof having a corresponding counterion,
ii) ion exchanging the counterion of the modified pigment to form an aqueous dispersion of a modified pigment comprising a pigment having attached at least one salt of a geminal bisphosphonic acid group or partial esters thereof having a corresponding quaternary ammonium counterion having the structure $NR'_4{}^+$, wherein R', which can be the same or different, is H, a C1-C6 alkyl group, an aryl group, or form a ring, and wherein the quaternary ammonium counterion has at least 6 total carbons, and
iii) optionally heat aging the aqueous dispersion of step ii) at a temperature of from 50° C. to 100° C. for a time between 0.5 and 5 days to form an aqueous dispersion of a modified pigment further comprising desorbed ions, and removing the desorbed ions; to form the aqueous modified pigment dispersion having a reduced conductivity increase.

43. The method of claim 42, wherein the quaternary ammonium counterion is a quaternary alkyl ammonium counterion and wherein at least one R' is a C2-C6 alkyl group.

* * * * *